(12) United States Patent
Hwang et al.

(10) Patent No.: US 10,620,434 B2
(45) Date of Patent: Apr. 14, 2020

(54) MULTI-LAYER IMAGING (71) Applicant: International Business Machines Corporation, Armonk, NY (US)

(72) Inventors: Inseok Hwang, Austin, TX (US); Su Liu, Austin, TX (US); Eric J. Rozner, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/412,097

(22) Filed: May 14, 2019

(65) Prior Publication Data

US 2019/0271841 A1 Sep. 5, 2019

Related U.S. Application Data

(63) Continuation of application No. 15/347,994, filed on Nov. 10, 2016, now Pat. No. 10,310,258.

(51) Int. Cl.
*G02B 27/01* (2006.01)
*G06T 5/00* (2006.01)
(Continued)

(52) U.S. Cl.
CPC ..... *G02B 27/0101* (2013.01); *G02B 27/0172* (2013.01); *G02C 7/101* (2013.01);
(Continued)

(58) Field of Classification Search
None
See application file for complete search history.

(56) References Cited

U.S. PATENT DOCUMENTS 5,539,547 A 7/1996 Ishii et al.
6,757,085 B1 6/2004 Halldorsson
(Continued)

FOREIGN PATENT DOCUMENTS

EP 1762975 A2 * 3/2007 ............ G06T 5/008

OTHER PUBLICATIONS

Alexander Meschtscherjakov,Hubert Scharfetter, Stefan Kernjak, Nino Kratzer, Julian Stadon, Adaptive Digital Sunshade: Blocking the Sun from Blinding the Driver, 2015, Automotive UI '15, Adjunct Pro of the 7th Int Conf on Automotive User Interfaces and Interactive Vehicular Applications, p. 78-83 (Year: 2015).*

(Continued)

*Primary Examiner* — Michael J Cobb
(74) *Attorney, Agent, or Firm* — Kunzler Bean & Adamson (57) ABSTRACT

For multi-layer imaging, an apparatus is disclosed. The apparatus includes a transparent display having multiple liquid crystal display (LCD) layers. The apparatus includes an image capture module that interfaces with a camera to capture multiple images of a target object. The apparatus includes an image processing module that identifies a bright spot in first and second images, identifies the target object in the first and second images proximate to the bright spot, and modifies at least one of first and second images to diminish the bright spot and to emphasize the target object. The apparatus includes an image display module that interfaces with the transparent display member to display the first image with the first LCD layer and display the second image with the second LCD layer after modifying at least one of the first and second images.

19 Claims, 9 Drawing Sheets

(51) Int. Cl.

| | | |
|---|---|---|
| *G09G 3/20* | (2006.01) | |
| *G02C 7/10* | (2006.01) | |
| *G06K 9/20* | (2006.01) | |
| *G06T 11/60* | (2006.01) | |
| *G06T 5/40* | (2006.01) | |
| *G06T 5/50* | (2006.01) | |
| *G06K 9/62* | (2006.01) | |
| *G06K 9/78* | (2006.01) | |
| *G06K 9/46* | (2006.01) | |
| *G02C 11/00* | (2006.01) | |
| *G02C 7/08* | (2006.01) | |

(52) U.S. Cl.
CPC .............. *G02C 7/105* (2013.01); *G06K 9/20* (2013.01); *G06K 9/4661* (2013.01); *G06K 9/6202* (2013.01); *G06K 9/78* (2013.01); *G06T 5/008* (2013.01); *G06T 5/40* (2013.01); *G06T 5/50* (2013.01); *G06T 11/60* (2013.01); *G09G 3/2092* (2013.01); *G02B 2027/014* (2013.01); *G02B 2027/0138* (2013.01); *G02B 2027/0141* (2013.01); *G02B 2027/0178* (2013.01); *G02C 7/086* (2013.01); *G02C 11/10* (2013.01); *G02C 2202/16* (2013.01); *G06T 2207/10024* (2013.01); *G06T 2207/10144* (2013.01); *G06T 2207/30252* (2013.01); *G09G 2320/0271* (2013.01); *G09G 2320/0686* (2013.01); *G09G 2340/00* (2013.01); *G09G 2340/14* (2013.01); *G09G 2360/16* (2013.01); *G09G 2380/10* (2013.01)

(56) References Cited

U.S. PATENT DOCUMENTS

| 7,199,767 | B2 | 4/2007 | Spero |
|---|---|---|---|
| 7,585,068 | B2 | 9/2009 | Mullin et al. |
| 7,586,079 | B2 | 9/2009 | Mullin et al. |
| 7,651,220 | B1 | 1/2010 | Pattikonda |
| 8,483,479 | B2 | 7/2013 | Kunkel et al. |
| 8,716,644 | B2 | 5/2014 | Wu et al. |
| 8,730,356 | B2 | 5/2014 | Ansfield et al. |
| 9,237,274 | B2 | 1/2016 | Russell |
| 9,262,690 | B2 | 2/2016 | Chiu |
| 9,285,589 | B2 | 3/2016 | Osterhout et al. |
| 9,321,329 | B2 | 4/2016 | Beckman |
| 9,601,083 | B2 | 3/2017 | Ramanathan |
| 2005/0146787 | A1 | 7/2005 | Lukyanitsa |
| 2005/0149251 | A1 | 7/2005 | Donath et al. |
| 2005/0219384 | A1 | 10/2005 | Herberger et al. |
| 2009/0036208 | A1 | 2/2009 | Pennington et al. |
| 2010/0100275 | A1 | 4/2010 | Mian et al. |
| 2011/0170189 | A1 | 7/2011 | Jackson, II |
| 2014/0079319 | A1* | 3/2014 | Lin .................. G06T 5/007 382/167 |
| 2014/0292825 | A1 | 10/2014 | Kim et al. |
| 2015/0077826 | A1 | 3/2015 | Beckman |
| 2015/0206347 | A1 | 7/2015 | Russell |
| 2016/0247256 | A1 | 8/2016 | Gupta et al. |
| 2016/0314762 | A1 | 10/2016 | Lee et al. |
| 2017/0018055 | A1 | 1/2017 | Holzer et al. |
| 2017/0151496 | A1 | 6/2017 | Heinz, II et al. |
| 2018/0114068 | A1* | 4/2018 | Balasundaram ...... G06T 7/0004 |

OTHER PUBLICATIONS

Alexander Boström, Fredrik Ramström, Head-up Display for Enhanced User Experience, 2014, Master of Science, Department of Applied Infromation Technology, Chalmers University of Technology, Gothenburg Sweeden. Report No. 2014:015, ISSN: 1651-4769 (Year: 2014).*

Hailong Liu, Toshihiro Hiraoka, Takatsugu Hirayama, Dongmin Kim, Saliency Difference based Objective Evaluation Method for a Superimposed Screen of the HUD with Various Background, 2019, arXiv:1905.05601, p. 1-10, retrieved from "https://arxiv.org/pdf/1905.05601.pdf", Accessed Nov. 24, 2019 (Year: 2019).*

R. Krutsh et al., "Histogram Equalization", NXP Freescale Semiconductor, Document No. AN4318, Jun. 2011, pp. 1-9.

* cited by examiner

Example — 510, 512, 514

518
Ah! It's a red light...

Layer 1:
Block Sun Glare
532
— 520

(Optional)
Layer 3:
Provide Light Source for Layer 2
536
— 522

Layer 2:
Calculated Picture
534

MULTI-LAYER IMAGING

REFERENCE TO RELATED APPLICATION

The present application is a continuation of and claims priority to U.S. patent application Ser. No. 15/347,994 filed on Nov. 10, 2016, the contents of which are incorporated herein by reference in their entirety.

FIELD

The subject matter disclosed herein relates to a system, apparatus, and method for image processing and more particularly relates to multi-layer imaging.

BACKGROUND

When driving a vehicle in urban areas, sun glare can inhibit and/or prevent people from seeing important features around them, such as traffic signals, road signs, other vehicles, pedestrians, etc. Sunglasses are typically used to diminish the effects of sun glare; however, the brightness of the sun may be substantial and blind people from seeing colors of traffic signals. This condition can develop into hazardous conditions. Further, merely blocking sun glare may not be enough to see a color of a traffic signal.

BRIEF SUMMARY

An apparatus for multi-layer imaging is disclosed. In one embodiment, the apparatus includes a transparent display member having multiple liquid crystal display (LCD) layers, including a first LCD layer and a second LCD layer. The apparatus includes an image capture module that interfaces with a camera to capture multiple images of a target object, including a first image of the target object and a second image of the target object. The apparatus includes an image processing module that identifies a bright spot in the first and second images, identifies the target object in the first and second images proximate to the bright spot, and modifies at least one of the first and second images to diminish the bright spot and to emphasize the target object. The apparatus includes an image display module that interfaces with the transparent display member to display the first image with the first LCD layer and display the second image with the second LCD layer after modifying at least one of the first and second images.

A method for multi-layer imaging is disclosed. In one embodiment, the method includes interfacing with a camera to capture multiple images of a target object, including a first image of the target object and a second image of the target object. The method includes identifying a bright spot in the first and second images. The method includes identifying the target object in the first and second images proximate to the bright spot. The method includes modifying at least one of the first and second images to diminish the bright spot and to emphasize the target object. Further, the method includes interfacing with a transparent display member having multiple liquid crystal display (LCD) layers, including a first LCD layer and a second LCD layer, to display the first image with the first LCD layer and display the second image with the second LCD layer after modifying at least one of the first and second images.

A computer program product that performs the functions of the method is disclosed. In one embodiment, the computer program product includes computer readable storage media having program instructions embodied therewith, the program instructions are readable/executable by a processor to cause the processor to interface with a camera to capture multiple images of a target object, including a first image of the target object and a second image of the target object. The program instructions further cause the processor to identify a bright spot in the first and second images. The program instructions cause the processor to identify the target object in the first and second images proximate to the bright spot. The program instructions cause the processor to modify at least one of the first and second images to diminish the bright spot and to emphasize the target object. The program instructions cause the processor to interface with a transparent display member having multiple liquid crystal display (LCD) layers, including a first LCD layer and a second LCD layer, to display the first image with the first LCD layer and display the second image with the second LCD layer after modifying at least one of the first and second images.

An apparatus for multi-layer imaging is disclosed. In one embodiment, the apparatus includes an image capture module that interfaces with a camera to capture multiple images of a target object, including a first image of the target object and a second image of the target object. The apparatus includes an image processing module that identifies a bright spot in the first and second images, identifies the target object in the first and second images proximate to the bright spot, and modifies at least one of the first and second images to diminish the bright spot and to emphasize the target object, and combines the first and second images to generate a single multi-layered image having the diminished bright spot and the emphasized target object.

A method for multi-layer imaging is disclosed. In one embodiment, the method includes capturing multiple images of a target object, including a first image of the target object and a second image of the target object. The method includes identifying a bright spot in the first and second images, and identifying the target object in the first and second images near the bright spot. The method includes modifying at least one of the first and second images to diminish the bright spot and to emphasize the target object. The method includes combining the first and second images to generate a single multi-layered image having the diminished bright spot and the emphasized target object.

A computer program product that performs the functions of the method is disclosed. In one embodiment, the computer program product includes computer readable storage media having program instructions embodied therewith, the program instructions are readable/executable by a processor to cause the processor to capture multiple images of a target object, including a first image of the target object and a second image of the target object. The program instructions cause the processor to identify a bright spot in the first and second images. The program instructions cause the processor to identify the target object in the first and second images near the bright spot. The program instructions cause the processor to modify at least one of the first and second images to diminish the bright spot and to emphasize the target object. The program instructions cause the processor to combine the first and second images to generate a single multi-layered image having the diminished bright spot and the emphasized target object.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIGS. 6A-7B are process flow diagrams illustrating various embodiments of methods for implementing multi-layer imaging techniques.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
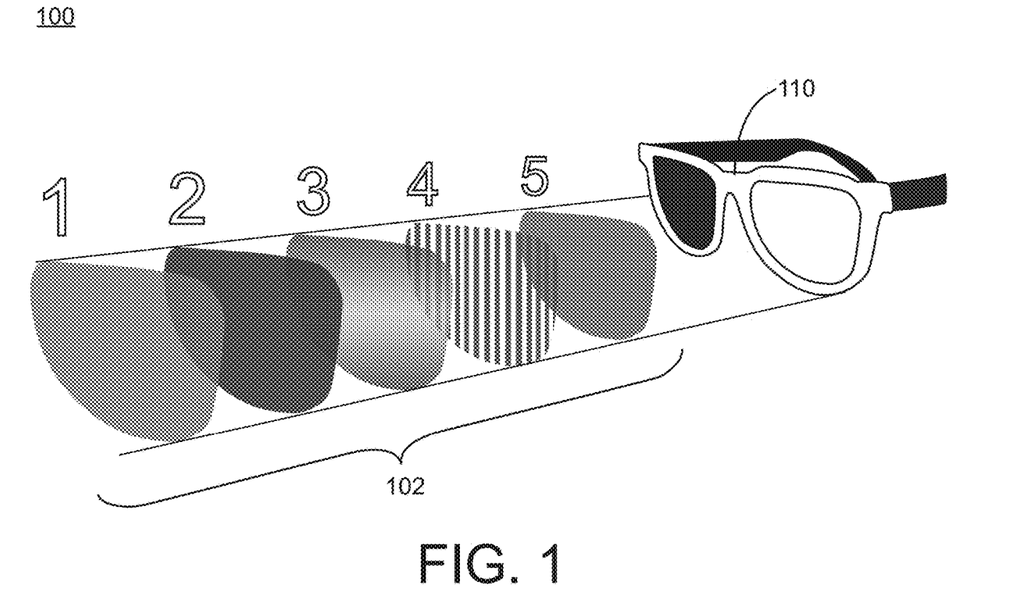
FIG. 1 is a diagram illustrating one embodiment of an eyewear apparatus having multi-layered lenses.

FIG. 1 is a diagram illustrating one embodiment of an eyewear apparatus 100 having multi-layered lenses 102.

In some implementations, the multi-layered lenses 102 may utilize multiple layers, such as, e.g., three (3) layers (or more, e.g., 4 or 5 layers) for diminishing a bright spot (e.g., sun glare) and for emphasizing a target object (e.g., traffic signals, road signs, etc.). For instance, a first layer (layer 1) may be utilized as a blocking layer that may darken the brightest spot, and a second layer (layer 2) may be utilized as an optional layer that provides a white light source for a third layer (layer 3). Further, the third layer (layer 3) may be utilized as a display layer to display, e.g., real-time live images (e.g., picture or video) to a user wearing the eyewear apparatus 100. In some instances, a fourth layer (layer 4) and/or a fifth layer (layer 5) may be utilized to provide other images to the user or to provide one or more conventional sunglass features, such as, e.g., gradient tint layers, polarizing films, scratch resistance, mirror coatings, etc.

In some implementations, the multi-layered lenses 102 may be referred to as a transparent display member that may be embodied as a lens (or lenses) for eyewear, such as, e.g., the eyewear apparatus 100. In other implementations, the transparent display member may be embodied as a windshield or window for a vehicle. Further, each layer of the transparent display member may be embodied as multiple liquid crystal display (LCD) layers, including a first LCD layer to display a first image, a second LCD layer to display a second image, a third LCD layer to display a third image, and so on.

Further, as shown in FIG. 1, the eyewear apparatus 100 may include a structural frame member 110, such as e.g., an eyeglass frame. In some instances, the multi-layered lenses 102 may be mounted to the structural frame member 110.

Figure 2:
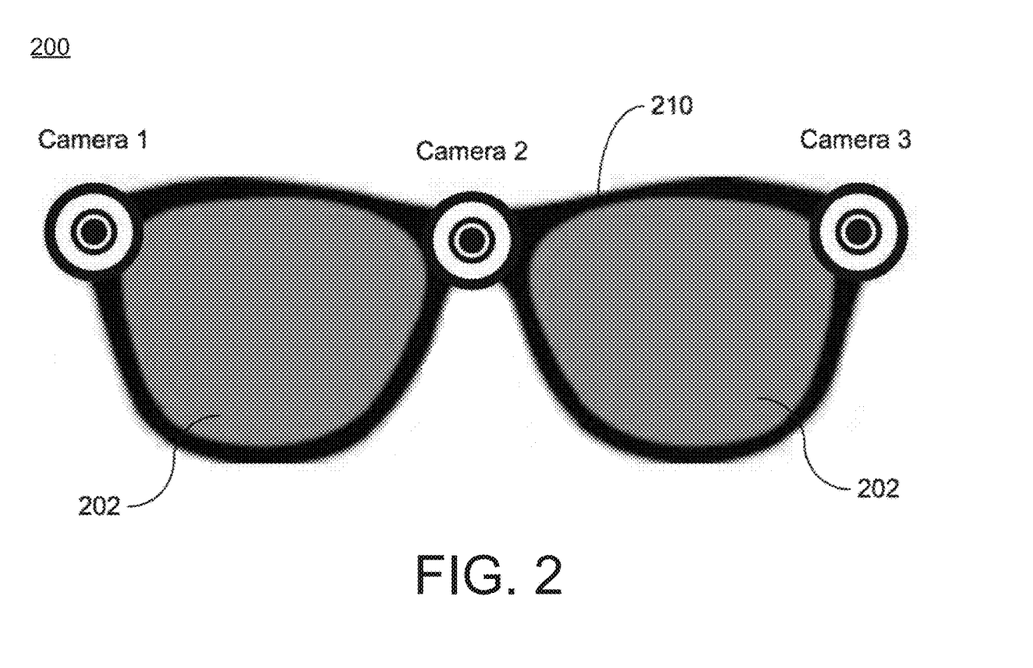
FIG. 2 is a front view diagram illustrating one embodiment of an eyewear apparatus having multiple cameras mounted thereto.

FIG. 2 is a front view diagram illustrating one embodiment of an eyewear apparatus 200 having multiple cameras 1, 2, 3 and multi-layered lenses 202 mounted to a structural frame member 210.

The multiple cameras 1, 2, 3 may include a first camera (camera 1) that captures a first image of a target object and a second camera (camera 2) that captures a second image of the target object. In some cases, the multiple cameras 1, 2, 3 may include an optional third camera (camera 3) that captures a third image of the target object. Each camera may be used to capture one or more images of a target object, including a first image of the target object with the first camera (camera 1), a second image of the target object with the second camera (camera 2), a third image of the target object with the third camera (camera 3), and so on.

It should be appreciated that, in some embodiments, the eyewear apparatus 200 may use only a single camera, such as, e.g., the first camera 1, to capture one or more images of the target object. For instance, the first camera 1 may be used to capture the first and second images of the target object. In another instance, the first camera 1 may be used to capture the first image of the target object, and then the first image may be duplicated to provide the second image, as a copy of the first image. Thus, the first camera 1 may be used to capture and provide multiple images of the target object. As described herein, post-processing of a single image by different techniques may be used to modify the captured image, e.g., by identifying and diminishing the brightest spot and emphasizing different information in the image, such as, e.g., traffic light colors.

Thus, in various implementations, the one or more cameras 1, 2, 3 of the eyewear apparatus 200 may be utilized to capture and/or display one or more images of a target object with one or more layers 1, 2, 3 to make sure real color is viewable and seen in reference to a target object. In some instances, the real color may be emphasized with utilization of different filters, different exposure techniques, different varying apertures, different ISO settings, etc. In some other cases, data from the different cameras may be combined to form a picture and/or video of a target object with emphasized color and light condition (exposure). High Dynamic Range (HDR) imaging may be utilized to emphasize a target object in each image and/or layer. In some use scenarios, features and techniques of the disclosure may be utilized to emphasize traffic light color and block (or darken) bright spots, such as, e.g., brightness from sun glare. In various use scenarios, features and techniques of the disclosure may be utilized for sunglasses, windshields, windows, etc., for improved viewing images of a target object having interference from a bright spot. In some implementations, various different types of cameras, such as, e.g., visible light cameras, infra-red (IR) cameras, ultra-violet (UV) cameras, radio frequency (RF) cameras, etc., may be utilized for detecting and capturing various different wave frequencies, including visible light spectrum and invisible electromagnetic radiation.

Figure 3:
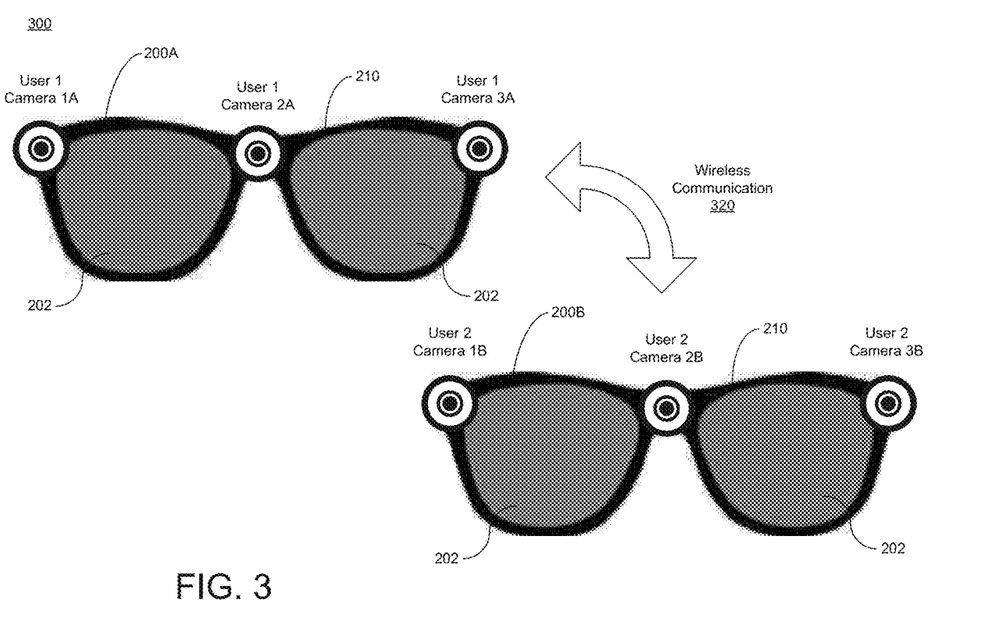
FIG. 3 is a front view diagram illustrating one embodiment of a wireless communication environment for multiple eyewear apparatuses.

FIG. 3 is a front view diagram illustrating one embodiment of a wireless communication environment 300 for multiple eyewear apparatuses 200A, 200B.

For instance, as shown in FIG. 3, a first user (user 1) may utilize a first eyewear apparatus 200A having multiple cameras 1A, 2A, 3A, and a second user (user 2) may utilize a second eyewear apparatus 200B having multiple cameras 1B, 2B, 3B. Each eyewear apparatus 200A, 200B may include one or more cameras 202 for capturing one or more images of a target object. In a basic mode of operation, the multiple cameras may be attached (or mounted) in a single pair of sunglasses (or windshield). In an advanced mode of operation, the multiple cameras may be attached (or mounted) in multiple different sunglasses (or windshields). In various implementations, real-time picture/video may be communicated between the multiple eyewear apparatuses 200A, 200B using a wireless connection 320, such as, e.g., Bluetooth, 802.11, Wi-Fi, and/or some other wireless communication protocol. This wireless communication environment may also be applied to windshields of multiple vehicles in a similar manner.

Figure 4:
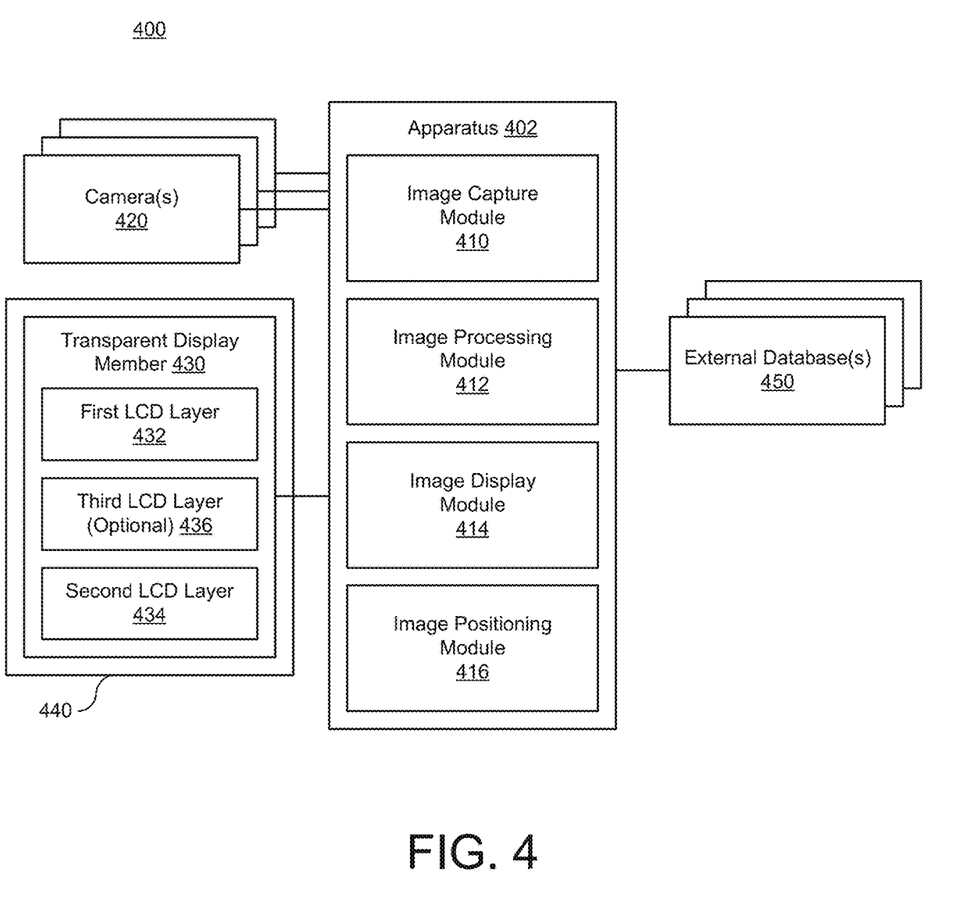
FIG. 4 is a block diagram illustrating one embodiment of an apparatus for for implementing multi-layer imaging techniques.

FIG. 4 shows a block diagram illustrating one embodiment of a system 400 that utilizes an apparatus 402 for implementing multi-layer imaging techniques.

The apparatus 402 may include a display, such as, e.g., a transparent display member 430 having multiple liquid crystal display (LCD) layers, including a first LCD layer 432 and a second LCD layer 434. In some instances, the transparent display member 430 may include an optional second LCD layer 436 that may be interposed between the first and second LCD layers 432, 434. Thus, in various implementations, the transparent display member 430 may include any number or quantity of LCD layers. Further, the apparatus 402 may include a structural frame member 440 such that the transparent display member 430 is mounted to the structural frame member 440. In some implementations, the transparent display member may be embodied as a lens for eyewear. In some other implementations, the transparent display member 430 may be embodied as a windshield for a vehicle, or some other type of window.

The apparatus 402 may include an image capture module 410 that interfaces with one or more cameras 420 to capture multiple images of a target object, including a first image of the target object and a second image of the target object. The target object may include at least one of a traffic signal, a road sign, a vehicle, a pedestrian, and an animal, and the bright spot may include at least one of a bright light and sun glare. In some instances, the first and second images may be embodied as first and second pictorial frames of the target object. Further, in various implementations, the image capture module 410 may interface with any number or quantity of cameras 420 to capture any number or any quantity of images, including any number or any quantity of images of the target object.

The image capture module 410 may interface with the one or more cameras 420 to capture multiple images of the target object. For instance, the image capture module 410 may interface with multiple cameras, such as, e.g., at least one camera 420 (i.e., first camera) to capture the first image of the target object with a first set of parameters. Further, in another instance, the image capture module 410 may interface with the at least one other camera 420 (i.e., first camera) or at least one other camera 420 (i.e., second camera) to capture the second image of the target object with a second set of parameters that are different than the first set of parameters. Thus, in some implementations, the image capture module 410 may interface with a first camera to capture the first image of the target object with a first set of parameters, and further, the image capture module 412 may interface with a second camera to capture the second image of the target object with a second set of parameters that are different than the first set of parameters. In various implementations, the first and second set of parameters may include one or more different filter settings, one or more different fields of view, one or more different perspectives, one or more different times, one or more different exposure settings, one or more different aperture settings, and/or one or more different ISO settings, and/or various other types of parameters.

The apparatus 402 may include an image processing module 412 that identifies a bright spot in the first and second images, identifies the target object in the first and second images proximate to the bright spot, and modifies at least one of the first and second images to diminish the bright spot and to emphasize the target object. The image processing module 412 may modify the first and second images by applying a histogram to one or more of the first and second images to diminish an intensity of the bright spot and to strengthen an intensity of the target object. For instance, the image processing module 412 may modify the first and second images by darkening or blocking the bright spot in one or more of the first and second images to diminish the bright spot and to emphasize the target object.

In some instances, the image processing module 412 may apply the histogram to one or more colors in each of the first and second images to diminish the bright spot and to emphasize the target object. The one or more colors may include one or more of red (R), green (G), and blue (B), e.g., in reference to RGB color formatting. The one or more colors may include one or more of cyan (C), magenta (M), yellow (Y), and black (B), e.g., in reference to CMYK color formatting. Further, each of the one or more colors may include gray scale parameters for adjusting shades of gray.

The image processing module 412 may generate a third image of the target object. For instance, the image processing module 412 may generate the third image of the target object by duplicating the first or second images of the target object. In another instance, the third image of the target object may be captured by the image capture module 410 with the one or more cameras 420. Further, the image processing module 412 may modify the third image by circumscribing a portion of the third image that surrounds the bright spot, and the image processing module 412 may brighten the circumscribed portion of the third image.

The apparatus 402 may include an image display module 414 that interfaces with the transparent display member 430 to display the first image with the first LCD layer 432 and display the second image with the second LCD layer 434 after modifying at least one of the first and second images. The image display module 414 may further interface with the transparent display member 430 to optionally display the third image with the second LCD layer 436.

The apparatus 402 may include an image positioning module 416 that interfaces with the image capture module 410 to determine and/or identify a location and/or direction of each of the one more cameras 420. For instance, each of the multiple cameras 420 may be installed in different locations and may have different positions and points of view (POV, compass direction, etc.) with respect to the target object. As such, the positioning module 416 may be used to identify and/or determine the location and/or direction (e.g. point of direction) of each camera 420 when images are captured. Further, this position and/or direction information may be used to combine the multiple captured images together. In various scenarios, position and/or direction information may include Global Positioning System (GPS) data and information, including global coordinates, such as, e.g., longitude, latitude, altitude, and/or compass related data and information. In some other scenarios, each of the cameras 420 may include a GPS module that provides GPS location data and information to the apparatus 402 for each captured image.

The apparatus 402 may interface and extract data from one or more memory devices, such as, e.g., one or more external databases 450. In some implementations, the image processing module 412 may compare the target object in the first and second images to one or more stored images in at least one of the database 450 to identify one or more objects (or various other objects) that may correspond to the target object. For instance, the image processing module 412 may identify one or more objects (or other objects) near or proximate to the bright spot in the first and second images by accessing one or more stored images in the one or more databases 450 that correspond to the one or more objects (or other objects) identified near the bright spot. In some cases, images obtained from internal or external databases may be processed or calculated to verify that the images are from a same source, e.g., using GPS, compass, etc.

Figure 5:
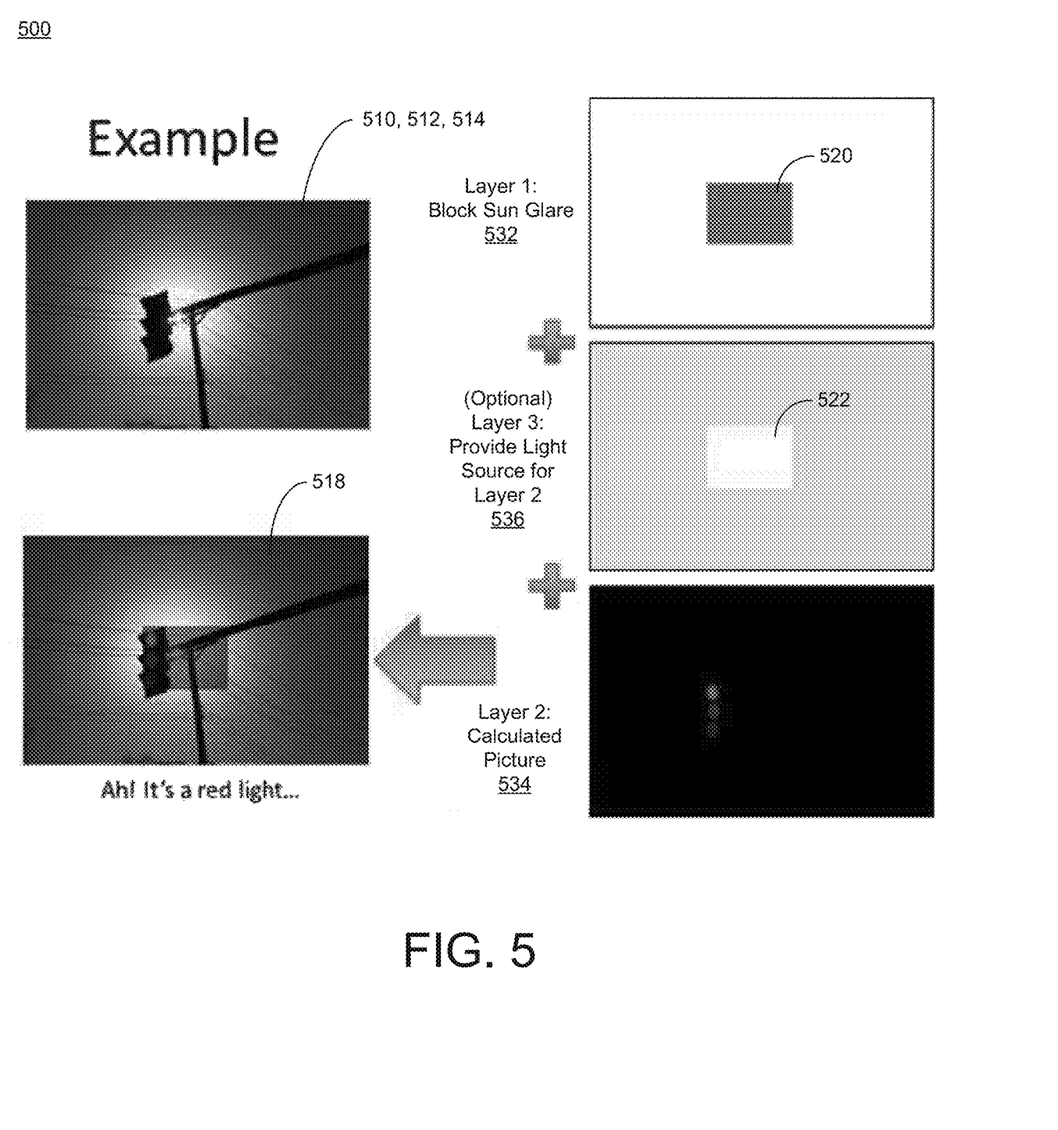
FIG. 5 is a process flow diagram illustrating one embodiment of a multi-layer imaging technique.

FIG. 5 is a process flow diagram illustrating one embodiment of a multi-layer imaging technique 500. In some implementations, the apparatus 400 of FIG. 4 may be used to perform the multi-layer imaging technique 500 of FIG. 5.

For instance, the image capture module 410 may be used to interface with the one or more cameras 420 to capture multiple images of a target object, including first and second images 510, 512 of the target object. In some cases, the one or more cameras may include multiple cameras, such as, e.g., a first camera for capturing the first image of the target object, a second camera for capturing the second image of the target object. In some other cases, the multiple cameras may include a third camera for capturing a third image of the target object, and so on. As described herein, each of the cameras may have separately controlled or pre-determined features for capturing images with varying and/or different parameter settings. For instance, the first camera may capture a first image of the target object with a first set of parameters, and the second camera may capture a second image of the target object with a second set of parameters that are different than the first set of parameters, and so on.

Further, the image processing module 412 may be used to identify a bright spot in the first and second images 510, 512, identify the target object in the first and second images 510, 512 proximate to the bright spot, and modify at least one of the first and second images 510, 512 to diminish the bright spot and emphasize the target object. Further, the image processing module 412 may be used to combine the first and second images 510, 512 (as layers) to generate a single multi-layered image 518 having the diminished bright spot and the emphasized target object.

In some implementations, the first image 510 may be used to define a first layer 532 of the single multi-layered image 518, and the second image 512 may be used as a second layer 534 of the single multi-layered image 518. The first and second layers 532, 534 may be overlaid with each other to generate the single multi-layered image 518. For instance, as shown in FIG. 5, the image processing module 412 may be used to modify the first and second images 510, 512 by circumscribing a portion 520 of the first image 510 that surrounds the bright spot (e.g., as shown with the first layer 532), darkening the circumscribed portion 520 of the first image 510 to diminish the bright spot (e.g., as shown with the first layer 532), and applying a histogram to the second image 512 to emphasize the target object (e.g., as shown with the second layer 534). Thus, in some use scenarios, the first layer 532 may be utilized to block or diminish a bright spot in an image (e.g., block sun glare), the second layer 534 may be used to display a calculated or modified image (e.g., a histogram modified image), and the optional third layer 536 may be used to provide a light source in an image (e.g., a white light source or a brightened image) for assisting with displaying the second layer 534.

Optionally, as shown in FIG. 5, the image processing module 412 may be used to generate a third image 514 of the target object by capturing another image of the target object or by duplicating the first image 510 of the target object (e.g., for use as an optional third layer 536). The image processing module 412 may be used to modify the third image 514 by circumscribing a portion 522 of the third image 514 (e.g., as shown with the third layer 536) that surrounds the bright spot and brightening the circumscribed portion 522 of the first image (e.g., as shown with the third layer 536). Further, the image processing module 412 may be used to combine the first, second, and third images 510, 512, 514 (e.g., as layers 532, 534, 536) to generate the single multi-layered image 514 by overlaying the third image 514 (or third layer 536) on the first image 510 (or the first layer 532) and overlaying the second image 512 (or second layer 534) on the third image 514 (or third layer 536) to thus generate the single multi-layered image 514 having the diminished bright spot and the emphasized target object.

As shown in FIG. 5, the first layer 532 may be modified by circumscribing the portion 520 of the first and/or second images 510, 512 that surround the bright spot, darkening the circumscribed portion 520 of the first and/or second images 510, 512 to diminish the bright spot. The second layer 534 may be modified by applying a histogram to the first and/or second images 510, 512 to emphasize the target object. Further, the first and second layers 532, 534 may be combined to generate the single multi-layered image 518 having at least one of the diminished bright spot and the emphasized target object. In some cases, the image display module 412 of FIG. 4 may interface with the transparent display member 430 to display the single multi-layered image 518 with at least one of the first and second LCD layers 432, 436. In some cases, the image processing module 412 may combine the first and second layers 532, 534 by blending and/or coalescing different parameters associated with the first and second layers 532, 534 into the single multi-layered image 518 having the diminished bright spot and the emphasized target object.

In some implementations, as shown in FIG. 5, the target object may be a traffic signal having multi-colored lights that designate a particular traffic state, such as, e.g., red for stop, yellow for yield, and green for go. However, in various implementations, the target object may include a road sign, a vehicle, a pedestrian, an animal, etc. Further, in various implementations, the bright spot may include at least one of a bright light, sun glare, or some other similar bright object, such as, e.g., an on-coming vehicle with high beam lights on. The first and second images (or layers) may be modified, e.g., by applying a histogram to one or more colors in each of the first and second images to diminish the bright spot and/or to emphasize the target object. The one or more colors may include one or more of red, green, and blue for RGB imaging and/or one or more of cyan, magenta, yellow, and black for CMYK imaging. The first and second images may be modified, e.g., by darkening or blocking the bright spot in one or more of the first and second images (or layers) to diminish the bright spot and/or to emphasize the target object.

In some implementations, the target object in the first and second images (or layers) may be compared to one or more stored images in an internal database and/or an external database to identify (or define, match, examine, measure, correlate, etc.) one or more other objects that correspond to the target object. The stored images may include and/or be selected from various images of traffic signals, road signs, vehicles, pedestrians, animals, or their derivatives, or having similarities, or having corresponding features. In some instances, one or more other objects near the bright spot in the first and second images (or layers) may be identified (or defined, matched, examined, measured, correlated, etc.) by accessing one or more stored images in an internal database and/or an external database that correspond to the one or more other objects identified near the bright spot.

Further, in some implementations, the images captured by the cameras may be stored or recorded in memory and recalled for processing and/or display on a display device, such as, e.g., an LCD. The display devices may display the first and second images (or layers) and also display a multi-layered image of the first and second images as layers, e.g., in a single multi-layered image. In some cases, the first and second images (or layers) may be first and second pictorial frames of the target object. In various implementations, the display device may be embodied, e.g., as eyewear lenses or as a vehicle windshield.

FIGS. 6A-7B are process flow diagrams illustrating various embodiments of methods for implementing multi-layer imaging techniques.

Figure 6A:
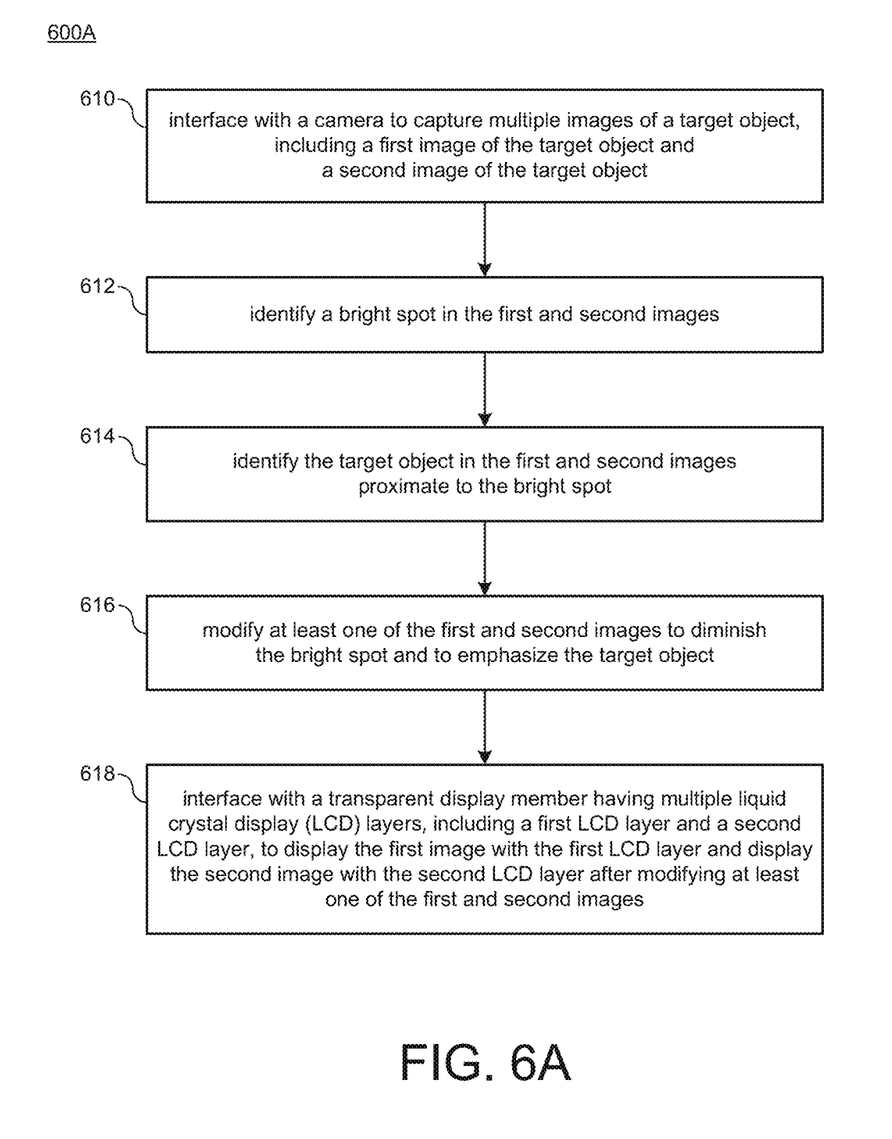

FIG. 6A shows a process flow diagram illustrating one embodiment of a method 600A for implementing a multi-layer imaging technique. In block 610, the method 600A may interface with a camera to capture multiple images of a target object, including a first image of the target object and a second image of the target object. In block 612, the method 600A may identify a bright spot in the first and second images. In block 614, the method 600A may identify the target object in the first and second images proximate to the bright spot. In block 616, the method 600A may modify at least one of the first and second images to diminish the bright spot and to emphasize the target object. In block 618, the method 600A may interface with a transparent display member having multiple liquid crystal display (LCD) layers, including a first LCD layer and a second LCD layer, to display the first image with the first LCD layer and display the second image with the second LCD layer after modifying at least one of the first and second images.

Figure 6B:
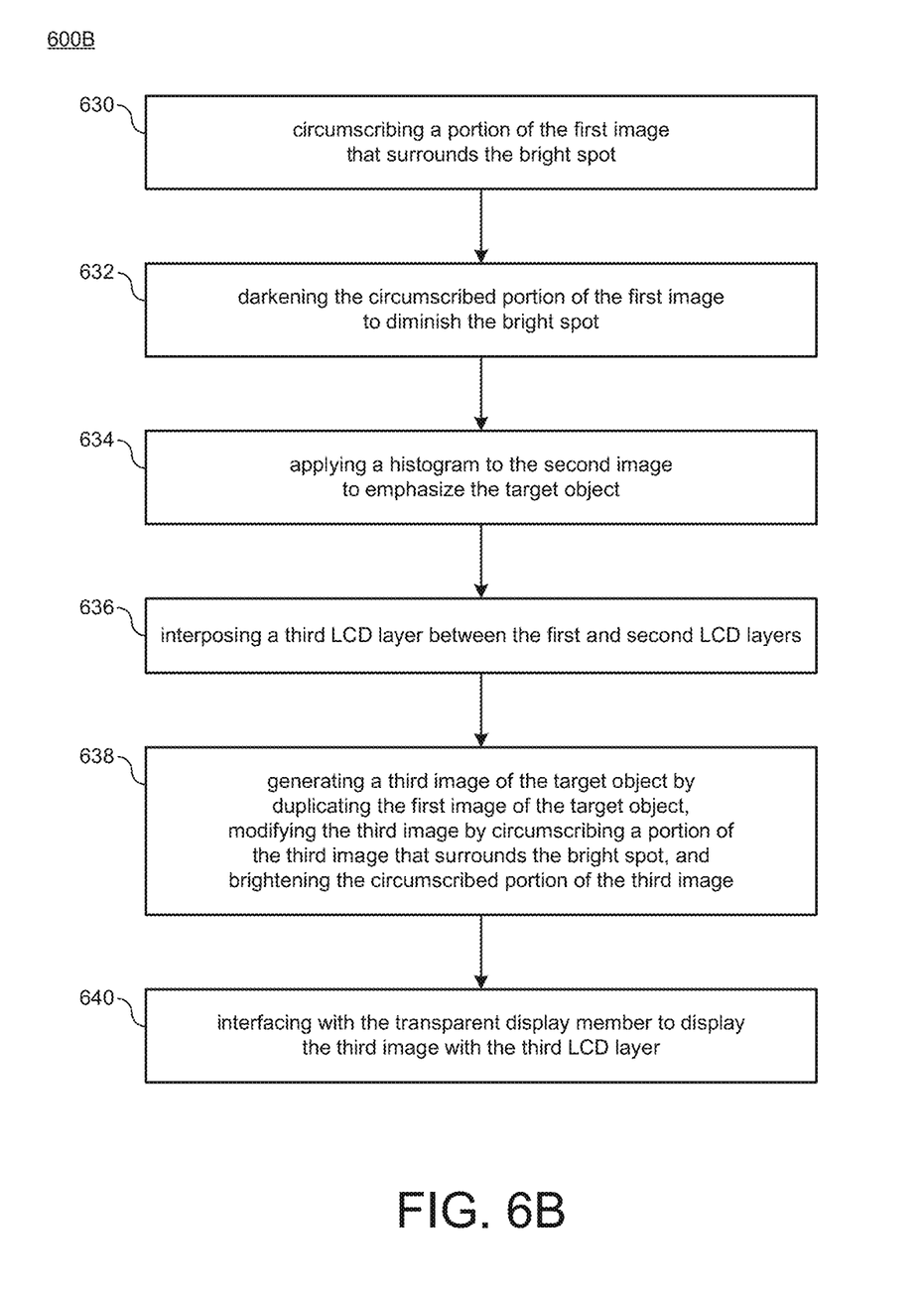

FIG. 6B shows a process flow diagram illustrating one embodiment of a method 600B for implementing a multi-layer imaging technique, including modifying the first and second images, e.g., as may be implemented in block 616 of FIG. 6A. In block 630, the method 600B may circumscribe a portion of the first image that surrounds the bright spot. In block 632, the method 600B may darken the circumscribed portion of the first image to diminish the bright spot. In block 634, the method 600B may apply a histogram to the second image to emphasize the target object. In block 636, the method 600B may interpose a third LCD layer between the first and second LCD layers. In block 638, the method 600B may generate a third image of the target object by duplicating the first image of the target object, modify the third image by circumscribing a portion of the third image that surrounds the bright spot, and brighten the circumscribed portion of the third image. In block 640, the method 600B may interface with the transparent display member to display the third image with the third LCD layer.

Figure 7A:
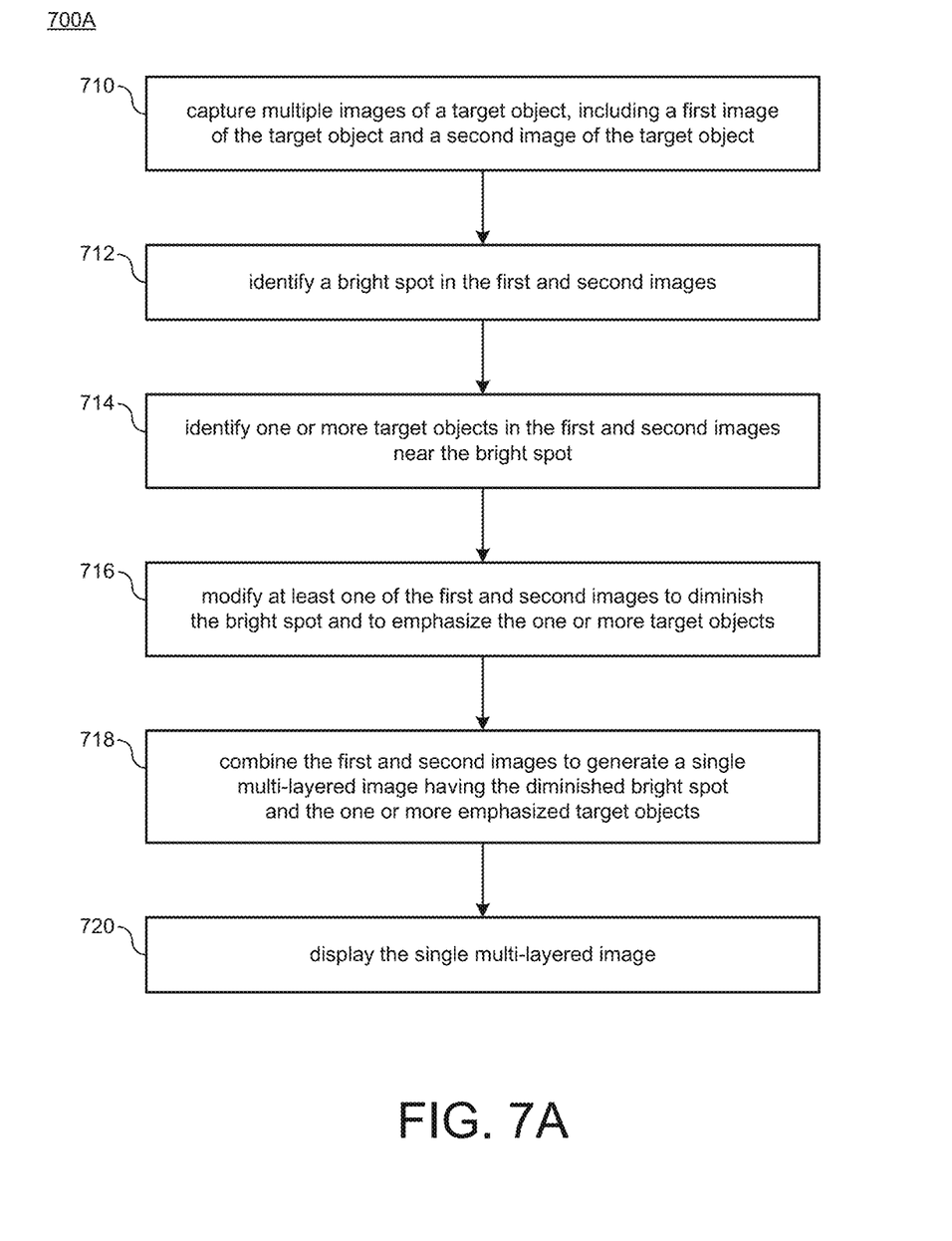

FIG. 7A shows a process flow diagram illustrating one embodiment of a method 700A for implementing a multi-layer imaging technique. In block 710, the method 700A may capture multiple images of a target object, including a first image of the target object and a second image of the target object. In block 712, the method 700A may identify a bright spot in the first and second images. In block 714, the method 700A may identify the target object in the first and second images near the bright spot. In block 716, the method 700A may modify at least one of the first and second images to diminish the bright spot and to emphasize the target object. In block 718, the method 700A may combine the first and second images to generate a single multi-layered image having the diminished bright spot and the emphasized target object. In block 720, the method 700A may display the single multi-layered image.

Figure 7B:
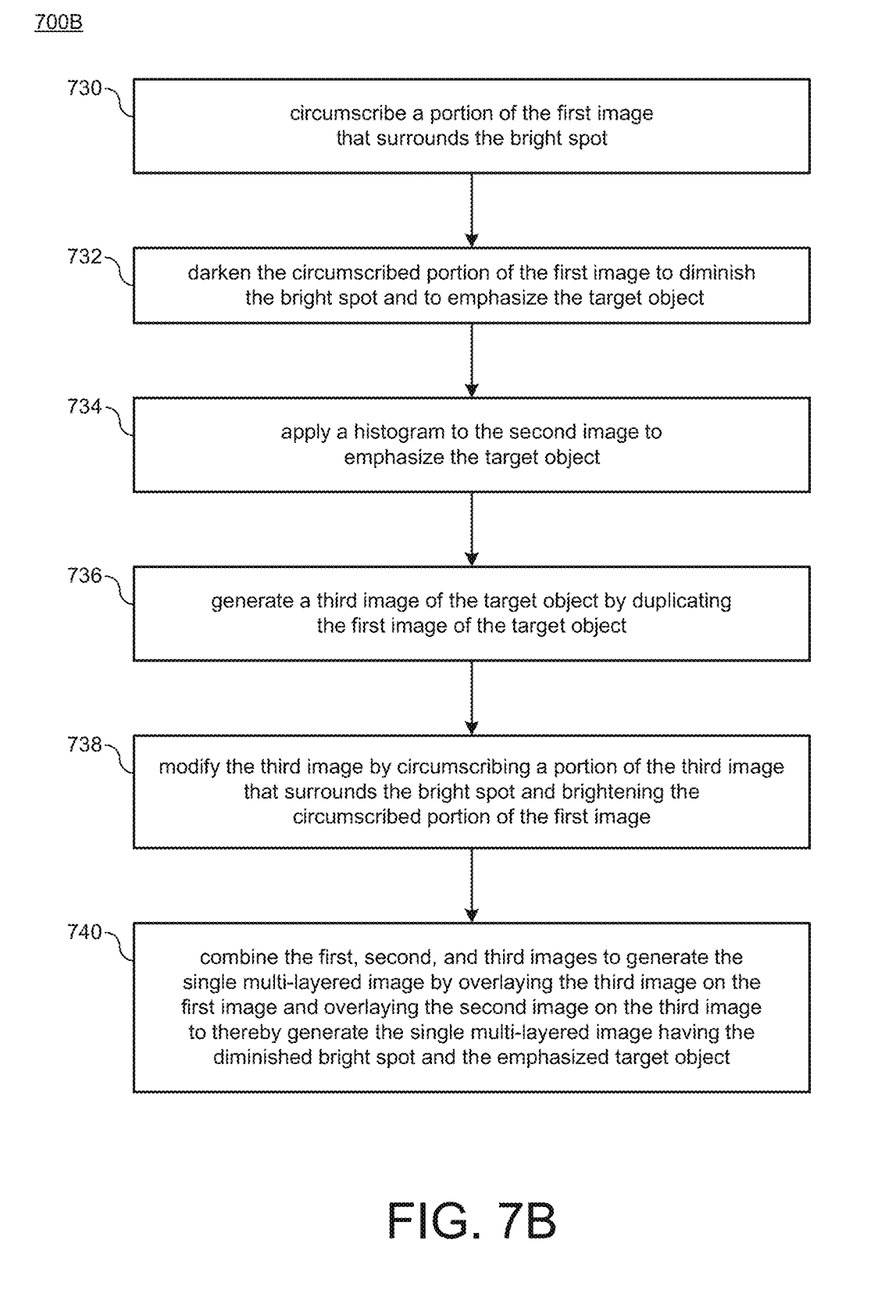

FIG. 7B shows a process flow diagram illustrating one embodiment of a method 700B for implementing a multi-layer imaging technique, including modifying the first and second images, e.g., as may be implemented in block 716 of FIG. 7A. In block 730, the method 700B may circumscribe a portion of the first image that surrounds the bright spot. In block 732, the method 700B may darken the circumscribed portion of the first image to diminish the bright spot. In block 734, the method 700B may apply a histogram to the second image to emphasize the target object. In block 736, the method 700B may generate a third image of the target object by duplicating the first image of the target object. In block 738, the method 700B may modify the third image by circumscribing a portion of the third image that surrounds the bright spot and brightening the circumscribed portion of the first image. In block 740, the method 700B may combine the first, second, and third images to generate the single multi-layered image by overlaying the third image on the first image and overlaying the second image on the third image to thereby generate the single multi-layered image having the diminished bright spot and the emphasized target object.

In some embodiments, a computer program product provides for multi-layer imaging, as described herein in reference to FIGS. 1-7B. In various implementations, the computer program product may include a computer readable storage medium having various program instructions that are readable/executable by a processor to cause the processor to perform embodiments of the methods 600A-700B, as described above in reference to FIGS. 6A-7B, respectively.

Figure 8:
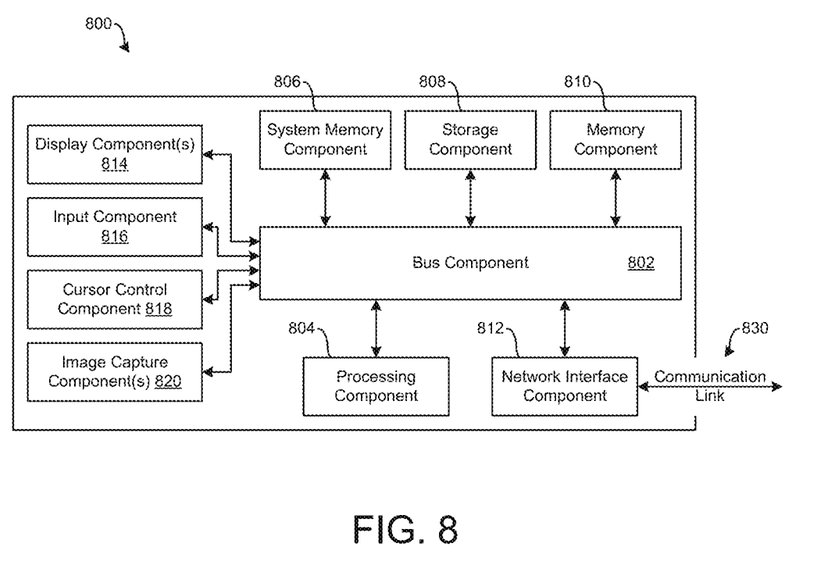
FIG. 8 illustrates a block diagram of one embodiment of a computing device for implementing multi-layer imaging techniques.

FIG. 8 shows a block diagram of a computing device 800 suitable for implementing multi-layer imaging techniques, including components of an apparatus, such as, e.g., the apparatuses 100, 200, 400. In some implementations, the apparatuses 100, 200, 400 may be embodied as various types of image display devices, such as, e.g., one or more lenses of eyewear, one or more windshields of a vehicle, windows of a housing structure, etc., having a communication network component that may be capable of communicating over a wired and/or wireless network with various other network computing devices, such as, e.g., one or more other similar apparatuses in peer-to-peer network, one or more other vehicles in wireless communication network, etc. Therefore, it should be appreciated that each apparatus 100, 200, 400 may be implemented as the computing device 800 for network communication in a manner as follows.

In accordance with embodiments of the disclosure, computer system 800 includes a bus 802 and/or other communication mechanism for communicating data and information, which interconnects subsystems and components, including processing component 804 (e.g., processor, microcontroller, digital signal processor (DSP), etc.), system memory component 806 (e.g., RAM), static storage component 808 (e.g., ROM), memory component 810 (e.g., magnetic), network interface component 812 (e.g., modem or Ethernet card), one or more display components 814 (e.g., LCD), input component 816 (e.g., push-buttons), cursor control component 818 (e.g., slider), and one or more image capture components 820 (e.g., one or more digital cameras). In one implementation, the memory component 810 may comprise one or more databases having one or more flash drive components, disk drive components, or similar.

In accordance with various embodiments of the disclosure, the computer system 800 performs specific operations by processor 804 executing one or more sequences of one or more instructions contained in system memory component 806. Such instructions may be read into system memory component 806 from another computer readable medium, such as static storage component 808 or memory component 810. In other embodiments, hard-wired circuitry may be used in place of or in combination with software instructions to implement the disclosure.

Logic may be encoded in a computer readable medium, which may refer to any medium that participates in providing instructions to processor 804 for execution. Such a medium may take many forms, including but not limited to, non-volatile media and volatile media. In various implementations, non-volatile media includes optical or magnetic disks, such as memory component 810, and volatile media includes dynamic memory, such as system memory component 806. In some implementations, data and information related to execution instructions may be transmitted to computer system 800 via a transmission media, such as in the form of acoustic or light waves, including those generated during radio frequency (RF) waves and infrared (IR) data communications. In various implementations, transmission media may include coaxial cables, copper wire, and/or fiber optics, including wires that comprise bus 802.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by computer system 800. In various other embodiments of the disclosure, a plurality of computer systems 800 coupled by communication link 830 (e.g., a LAN, WLAN, PTSN, and/or various other wired or wireless networks, including telecommunications, mobile, and cellular phone networks) may perform instruction sequences to practice implementations of the disclosure in coordination with one another.

In various embodiments of the disclosure, computer system 800 may transmit and receive messages, data, information and instructions, including one or more programs (i.e., application code) through communication link 830 and communication interface 812. Further, received program code may be executed by the processor 804 as received and/or stored in memory component 810 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the spirit of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a transparent display member;

an image capture module that interfaces with a camera to capture multiple images of a target object, including a first image of the target object and a second image of the target object;

an image processing module that:
identifies a bright spot in the first and second images,
identifies the target object in the first and second images proximate to the bright spot,
modifies the first image to diminish the bright spot, wherein modifying the first image to diminish the bright spot comprises darkening a portion of the first image that surrounds the bright spot to diminish the bright spot,
modifies the second image to emphasize a color of the target object, and
combines the first and second images to generate a single multi-layered image; and an image display module that interfaces with the transparent display member to display the single multi-layered image.

2. The apparatus of claim 1, wherein the transparent display member is embodied as a lens for eyewear.

3. The apparatus of claim 1, wherein the transparent display member is embodied as a windshield for a vehicle.

4. The apparatus of claim 1, wherein the target object comprises at least one of a traffic signal, a road sign, a vehicle, a pedestrian, and an animal, and wherein the bright spot comprises at least one of a bright light and sun glare.

5. The apparatus of claim 1, further comprising a structural frame member, wherein the transparent display member is mounted to the structural frame member.

6. The apparatus of claim 1, wherein the image capture module interfaces with the camera to capture the first image of the target object with a first set of parameters, and wherein the image capture module interfaces with the camera to capture the second image of the target object with a second set of parameters that are different than the first set of parameters, wherein the first and second sets of parameters include one or more of: different filter settings, different fields of view, different perspectives, different exposure settings, different aperture settings, and different ISO settings.

7. The apparatus of claim 1, wherein modifying the first image comprises the image processing module applying a histogram to the first image to diminish an intensity of the bright spot.

8. The apparatus of claim 7, wherein the image processing module applies the histogram to one or more colors in the first image to diminish the bright spot, and wherein the one or more colors comprise one or more of: red, green, blue, cyan, magenta, yellow, and black.

9. The apparatus of claim 1, wherein modifying the second image to emphasize the target object comprises the image processing module applying a histogram to the second image.

10. The apparatus of claim 1, wherein combining the first and second images to generate the single multi-layered image comprises blending or coalescing at least one parameter associated with each of the first and second images.

11. The apparatus of claim 1, wherein the image processing module compares the target object in the first and second images to one or more stored images in a database to identify one or more other objects that correspond to the target object.

12. The apparatus of claim 1, wherein the image processing module identifies one or more other objects near the bright spot in the first and second images by accessing one or more stored images in a database that correspond to the one or more other objects identified near the bright spot.

13. The apparatus of claim 1, wherein the camera comprises multiple cameras, including a first camera that captures the first image of the target object and a second camera that captures the second image of the target object.

14. The apparatus of claim 13, wherein the image capture module interfaces with the first camera to capture the first image of the target object with a first set of parameters, and wherein the image capture module interfaces with the second camera to capture the second image of the target object with a second set of parameters that are different than the first set of parameters, wherein the first and second sets of parameters include one or more of: different filter settings, different fields of view, different perspectives, different exposure settings, different aperture settings, and different ISO settings.

15. The apparatus of claim 1, wherein modifying the second image comprises the image processing module applying a histogram to the second image to strengthen an intensity of the target object.

16. The apparatus of claim 15, wherein the image processing module applies the histogram to one or more colors in the second image to emphasize the target object, and wherein the one or more colors comprise one or more of red, green, blue, cyan, magenta, yellow, and black.

17. A method, comprising:
interfacing with a camera to capture multiple images of a target object, including a first image of the target object and a second image of the target object;
identifying a bright spot in the first and second images;
identifying the target object in the first and second images proximate to the bright spot;
modifying the first image to diminish the bright spot, wherein modifying the first image to diminish the bright spot comprises darkening a portion of the first image that surrounds the bright spot to diminish the bright spot;
modifying the second image to emphasize the target object, wherein modifying the second image to emphasize the target object comprises applying a histogram to the second image;
combining the first and second images to generate a single multi-layered image; and
interfacing with a transparent display member having a liquid crystal display (LCD) layer to display the single multi-layered image.

18. The method of claim 17, wherein interfacing with a camera to capture the first image of the target object and the second image of the target object comprises:
capturing the first image of the target object with a first set of parameters, and
capturing the second image of the target object with a second set of parameters that are different than the first set of parameters,
wherein the first and second sets of parameters include one or more of: different filter settings, different fields of view, different perspectives, different exposure settings, different aperture settings, and different ISO settings.

19. A non-transitory computer-readable medium having stored thereon a plurality of computer-executable instructions that, when executed by a computing device, cause the computing device to:
interface with a camera to capture multiple images of a target object, including a first image of the target object and a second image of the target object;

identify a bright spot in the first and second images;
identify the target object in the first and second images proximate to the bright spot;
modify the first image to diminish the bright spot, wherein modifying the first image to diminish the bright spot comprises darkening a portion of the first image that surrounds the bright spot to diminish the bright spot;
modify the second image to emphasize the target object, wherein modifying the second image to emphasize the target object comprises applying a histogram to the second image;
combine the first and second images to generate a single multi-layered image; and
interface with a transparent display member having a liquid crystal display (LCD) layer to display the single multi-layered image.

\* \* \* \* \*